(12) United States Patent
Close et al.

(10) Patent No.: US 9,784,599 B1
(45) Date of Patent: Oct. 10, 2017

(54) MODULAR INFRASTRUCTURE ASSET INSPECTION ROBOT

(71) Applicant: RedZone Robotics, Inc., Pittsburgh, PA (US)

(72) Inventors: Eric C. Close, Sewickley, PA (US); Subramanian Vallapuzha, Pittsburgh, PA (US); Kevin Lipkin, Pittsburgh, PA (US)

(73) Assignee: RedZone Robotics, Inc., Pittsburgh, PA (US)

( * ) Notice: Subject to any disclaimer, the term of this patent is extended or adjusted under 35 U.S.C. 154(b) by 895 days.

(21) Appl. No.: 13/654,393

(22) Filed: Oct. 17, 2012

Related U.S. Application Data (60) Provisional application No. 61/547,899, filed on Oct. 17, 2011.

(51) Int. Cl.
*B60F 5/00* (2006.01)
*G01D 11/00* (2006.01)
(Continued)

(52) U.S. Cl.
CPC ............ *G01D 11/00* (2013.01); *B60F 3/0061* (2013.01); *B60F 5/00* (2013.01); *F16L 55/26* (2013.01);
(Continued)

(58) Field of Classification Search
CPC G01D 11/00; F16L 55/26; F16L 55/28; F16L 55/40; F16L 55/30; F16L 55/32;
(Continued)

(56) References Cited

U.S. PATENT DOCUMENTS

| 6,108,597 A | * | 8/2000 | Kirchner et al. ............... 701/23 |
| 6,431,270 B1 | * | 8/2002 | Angle .......................... 166/66.5 |

(Continued)

FOREIGN PATENT DOCUMENTS

| DE | 10215325 A1 * | 10/2003 | ............... B08B 9/04 |
| NL | WO 9217728 A1 * | 10/1992 | ............ F16L 55/179 |

OTHER PUBLICATIONS

C.H. Chen, C. Chen, D. Page, A. Koschan, and M. Abidi, "Modular Robotics and Intelligent Imaging for Unmanned Systems," in Proc. SPIE Unmanned Systems Technology VIII, vol. 6230, Orlando, FL pp. 43-52, Apr. 2006.*

(Continued)

*Primary Examiner* — James A Shriver, II
*Assistant Examiner* — Steve Clemmons
(74) *Attorney, Agent, or Firm* — Cafardi, Ferguson, Wyrick, Weis & Stotler LLC; Andrew M. Gabriel (57) ABSTRACT

One aspect provides a modular infrastructure asset inspection robot, including: a plurality of modules for use in fluid conveyance infrastructure assets; each of the plurality of modules including at least one standardized electromechanical connection permitting a connection to be established with another of the plurality of modules; the plurality of modules being interchangeable and allowing reconfiguration of said modular infrastructure asset inspection robot to perform one or more of: two or more deployment methods for a first infrastructure asset type; and one deployment method for the first infrastructure asset type and a second infrastructure asset type. Other aspects are described and claimed.

19 Claims, 8 Drawing Sheets

(51) Int. Cl.
  *F16L 55/26* (2006.01)
  *B60F 3/00* (2006.01)
  *F16L 101/30* (2006.01)
(52) U.S. Cl.
  CPC . *F16L 2101/30* (2013.01); *G05B 2219/25101* (2013.01); *G05B 2219/33125* (2013.01); *G05B 2219/40095* (2013.01)
(58) Field of Classification Search
  CPC ....... F16L 55/46; F16L 55/48; F16L 2101/00; F16L 2101/30; G05B 2219/40095; G05B 2219/40099; G05B 2219/25101; G05B 2219/33125; B60F 3/00; B60F 3/0061; B60F 5/00; B25J 9/1617
  See application file for complete search history.

(56) References Cited

U.S. PATENT DOCUMENTS

| | | | | |
|---|---|---|---|---|
| 6,450,104 | B1* | 9/2002 | Grant et al. | 104/138.2 |
| 6,708,068 | B1* | 3/2004 | Sakaue | B25J 9/08 318/568.11 |
| 6,887,014 | B2* | 5/2005 | Holland | 405/184.1 |
| 7,210,364 | B2* | 5/2007 | Ghorbel et al. | 73/865.8 |
| 7,555,363 | B2* | 6/2009 | Augenbraun | A47L 5/225 134/18 |
| 7,720,570 | B2* | 5/2010 | Close et al. | 700/245 |
| 8,201,649 | B2* | 6/2012 | Andrus et al. | 180/9.48 |
| 8,571,711 | B2* | 10/2013 | Jacobsen | B08B 9/045 180/9.21 |
| 8,805,579 | B2* | 8/2014 | Skrinde | B08B 9/049 134/18 |
| 2003/0121338 | A1* | 7/2003 | Yates | 73/865.8 |
| 2006/0290779 | A1* | 12/2006 | Reverte et al. | 348/84 |
| 2008/0068601 | A1* | 3/2008 | Thayer et al. | 356/241.3 |
| 2010/0218624 | A1* | 9/2010 | Atwood et al. | 73/865.8 |

OTHER PUBLICATIONS

B. Salemi, M. Moll, and W. Shen, "SUPERBOT: A Deployable, Multi-Functional, and Modular Self-Reconfigurable Robotic System," in IROS' 06 proceedings, pp. 3636-3641.*

A. Elkady, J. Joy, and T. Sobh, "A plug and play middleware for sensory modules, actuation platforms and task descriptions in robotic manipulation platforms," in Proc. of the ASME 2011 Int'l Design Engineering Technical Conferences & Computers and Information in Engineering Conference, Aug. 28-31, 2011.*

* cited by examiner

FIG. 8

MODULAR INFRASTRUCTURE ASSET INSPECTION ROBOT

CROSS REFERENCE TO RELATED APPLICATIONS

This application claims priority to U.S. Provisional Patent Application Ser. No. 61/547,899, entitled "PIPE INSPECTION ROBOT WITH MODULAR HARDWARE AND SOFTWARE", filed on Oct. 17, 2011, the contents of which are incorporated by reference in their entirety herein.

FIELD

The subject matter described herein generally relates to modular infrastructure asset inspection robots.

BACKGROUND

There are many contexts in which a condition of a pipe is of importance. For example, every year, wastewater managers must make decisions about which portions of their collection system should be maintained, rehabilitated or replaced. The Environmental Protection Agency (EPA) and American Society of Civil Engineers (ASCE) both project hundreds of billions of dollars of investment shortfalls facing aging wastewater infrastructure. Thus, it is important that wastewater managers are able to spend their limited funds most wisely to reduce risks and maintain service levels at a low cost.

In the example context of managing a municipal wastewater collection system, a wastewater manager faced with a limited budget makes prioritization and investment decisions based on the best information available at the time. Adequate technology for providing accurate data acquisition and representations of the condition of the pipe sections making up the collection system, which may comprise many different pipe segment types, is therefore important.

BRIEF SUMMARY

In summary, one aspect provides a modular infrastructure asset inspection robot, comprising: a plurality of modules for use in fluid conveyance infrastructure assets; each of said plurality of modules including at least one standardized electromechanical connection permitting a connection to be established with another of the plurality of modules; said plurality of modules being interchangeable and allowing reconfiguration of said modular infrastructure asset inspection robot to perform one or more of: two or more deployment methods for a first infrastructure asset type; and one deployment method for the first infrastructure asset type and a second infrastructure asset type.

Another aspect provides a modular infrastructure asset inspection robot, comprising: a plurality of modules for use in fluid conveyance infrastructure assets, wherein said plurality of modules include a discovery module with at least one processor configured to detect that a first module of the modular infrastructure asset inspection robot has been connected to at least a second module of the modular infrastructure asset inspection robot.

A further aspect provides a modular infrastructure asset inspection robot, comprising: a plurality of modules connectable via a standardized electromechanical connection; wherein two or more modules are connectable for use in fluid conveyance infrastructure assets and provide inspect capability of more than one fluid conveyance infrastructure asset type in one single deployment.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 5(A-B) illustrates the contrast between the hierarchal physical network topology of an example modular pipe inspection robot and its flat logical addressing scheme.

FIG. 6(A-B) illustrates the behavior of subordinate modules within a modular inspection robot upon receiving the two network-administration messages defined by the networking scheme.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of those embodiments.

Reference throughout this specification to "embodiment(s)" (or the like) means that a particular feature, structure, or characteristic described in connection with the embodiment is included in at least one embodiment. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, et cetera. In other instances, well-known structures, materials, or operations are not shown or described in detail to avoid obfuscation.

In the context of this description, underground infrastructure involves the need to access and collect data in a variety of structures. In this regard, as used herein the terms "fluid conveyance infrastructure" or simply "infrastructure", have the meaning of water and/or sewer physical infrastructure, including pipes, manholes, laterals, access shafts, junction chambers, valve chambers, and treatment structures.

A challenge encountered by wastewater infrastructure managers in inspecting underground infrastructure is that there may be different mobility needs to traverse particular pipe type(s). It would be advantageous to obtain standard video or other sensor data sets for all the pipes. Conventionally, various different mobility platforms are chosen for various pipe segment types, and there is not a standard sensor package associated with all the various mobility platforms. Such mobility platforms may include for example a skid that is pulled through a pipe, a larger crawler or wheeled platform that traverses a pipe segment, a floating platform for the sensor package, etc. Thus, infrastructure managers are often left with varying sensor data driven by mobility platform choice.

Accordingly, an embodiment provides a modular robot that may be composed of different components for practically any given pipe segment type or inspection mission. In an embodiment, the robot may be deployed with its own tractor, or to be deployed as a bolt-on or plug in with either battery power or parasitic power. In an embodiment, the robot's sensor module is mounted on to a larger crawler that the sensor module may tap into for power through a parasitic adapter. This enables the sensor module to operate without battery restrictions and can leverage the powered, tethered operation of the host mobility platform, while still collecting the standard sensor data suite (e.g. closed circuit TV (CCTV) data, sonar data, laser data, and the like). Thus, an embodiment provides a sensor module to be used on a variety of mobility platforms, including autonomous or tele-operated mobility platforms.

The description now turns to the figures. The illustrated example embodiments will be best understood by reference to the figures. The following description is intended only by way of example and simply illustrates certain selected example embodiments representative of the invention, as claimed. It should be noted that although wastewater pipes are specifically mentioned as examples herein, the various embodiments may be employed in connection with other pipe segment types and other comparable infrastructure assets generally.

Figure 1:
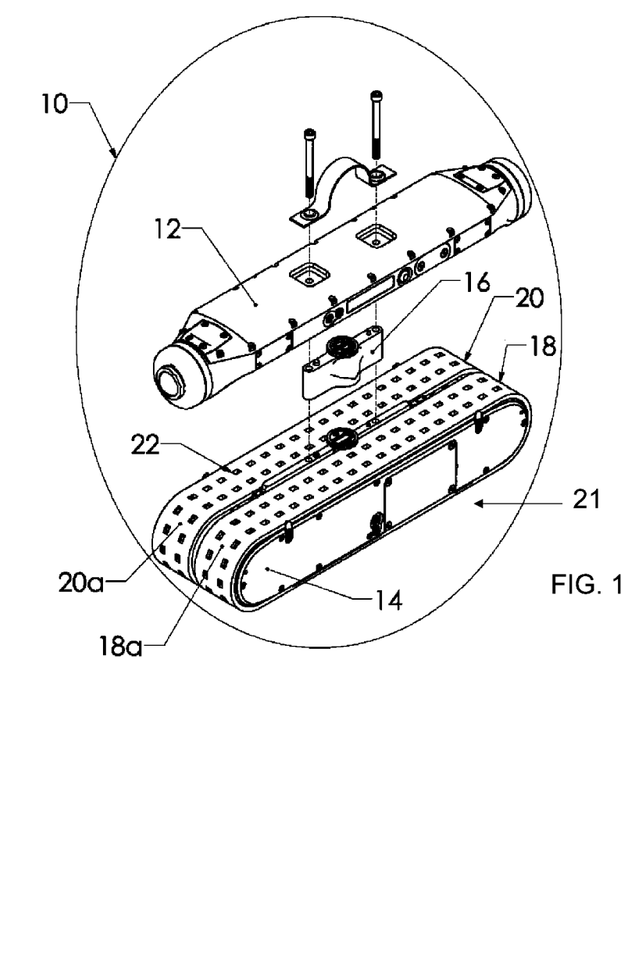
FIG. 1 illustrates example modular pipe inspection robots.

FIG. 1 illustrates an example modular infrastructure asset inspection robot 10 (referred to herein as a pipe inspection robot). For purposes of clarity, a partially exploded view of the pipe inspection robot 10 is shown in FIG. 1. As explained in more detail hereinafter, the pipe inspection robot 10 may be utilized to navigate, explore, map, etc. various environments (e.g., wastewater pipes, etc.). The pipe inspection robot 10 is illustrated in the context of an autonomous mobile pipe inspection robot 10, i.e., having an attachment to a tractor unit 21 for mobility, utilized for pipe inspection. However, as further described herein, the pipe inspection robot 10 is modular and components thereof, particularly sensor module 12, may be used in connection with any number of different types of mobility platforms in addition to the tractor unit 21 illustrated, including for example non-autonomous mobility devices such as a sled, tele-operated or tethered inspection platforms, with other tractor units (e.g. sized for mid-diameter pipe inspections, etc.), for deployment in a plurality of other environments.

The pipe inspection robot 10 includes a sensor module 12 and a chassis portion 14. The sensor portion 12 is electrically and mechanically connected to the chassis portion 14. As shown, the pipe inspection robot 10 may also include a riser portion 16 which is positioned between the sensor module 12 and the chassis portion 14, and is electrically and mechanically connected to each. The riser portion 16 may operate to increase the distance the sensor module 12 is situated above the lowest portion of the pipe to be inspected, and may be utilized in large pipe applications to provide a desired vantage point for various sensing devices of the sensor module 12. According to other embodiments, the pipe inspection robot 10 does not include the above-described riser portion 16 or may include another riser or adaptor portion.

According to various embodiments, the sensor module 12 includes a plurality of sensing devices (e.g., a camera, a radar device, a sonar device, an infrared device, a laser device, etc.) for sensing the conditions within the environment, a computing device communicably connected to the sensing devices and having a processor for processing raw information captured by the sensing devices, a memory device communicably connected to the computing device for storing the raw and/or processed information, and control circuitry communicably connected to the computing device for controlling various components of the pipe inspection robot 10. The memory device may also be utilized to store software which is utilized by the pipe inspection robot 10 to navigate, explore, map, etc., the environment. More than one memory device may be included, and program data may run, and data may be stored, on more than one memory device.

The pipe inspection robot 10 (either in one or more modules) may include communication means, as further described herein, for communicating data to and receiving data from remote devices. In one example, the pipe inspection robot 10 may transmit sensed data to a remote device, either prior to or after processing the sensed data, along with other data, e.g., location data. In one example, such a remote device may include a platform device, such as described in co-pending and commonly assigned U.S. patent application Ser. No. 13/654,380, entitled "ANALYZING INFRASTRUCTURE DATA", filed on Oct. 17, 2012, the contents of which are incorporated by reference herein.

As shown, the chassis portion 14 includes a first track 18, and a second track 20. According to various embodiments, the first track 18 may be identical to the second track 20. The first and second tracks 18, 20 may be fabricated from any suitable material or combination of materials, and may be fabricated as belts. The first and second tracks 18, 20 may each include a plurality of openings 22. The openings 22 may be of any suitable shape and size, and may be arranged in any suitable configuration. The first track 18 may be positioned adjacent the second track 20. Collectively, the first and second tracks 18, 20 cover a substantial portion of the width of the chassis portion 14.

Figure 2:
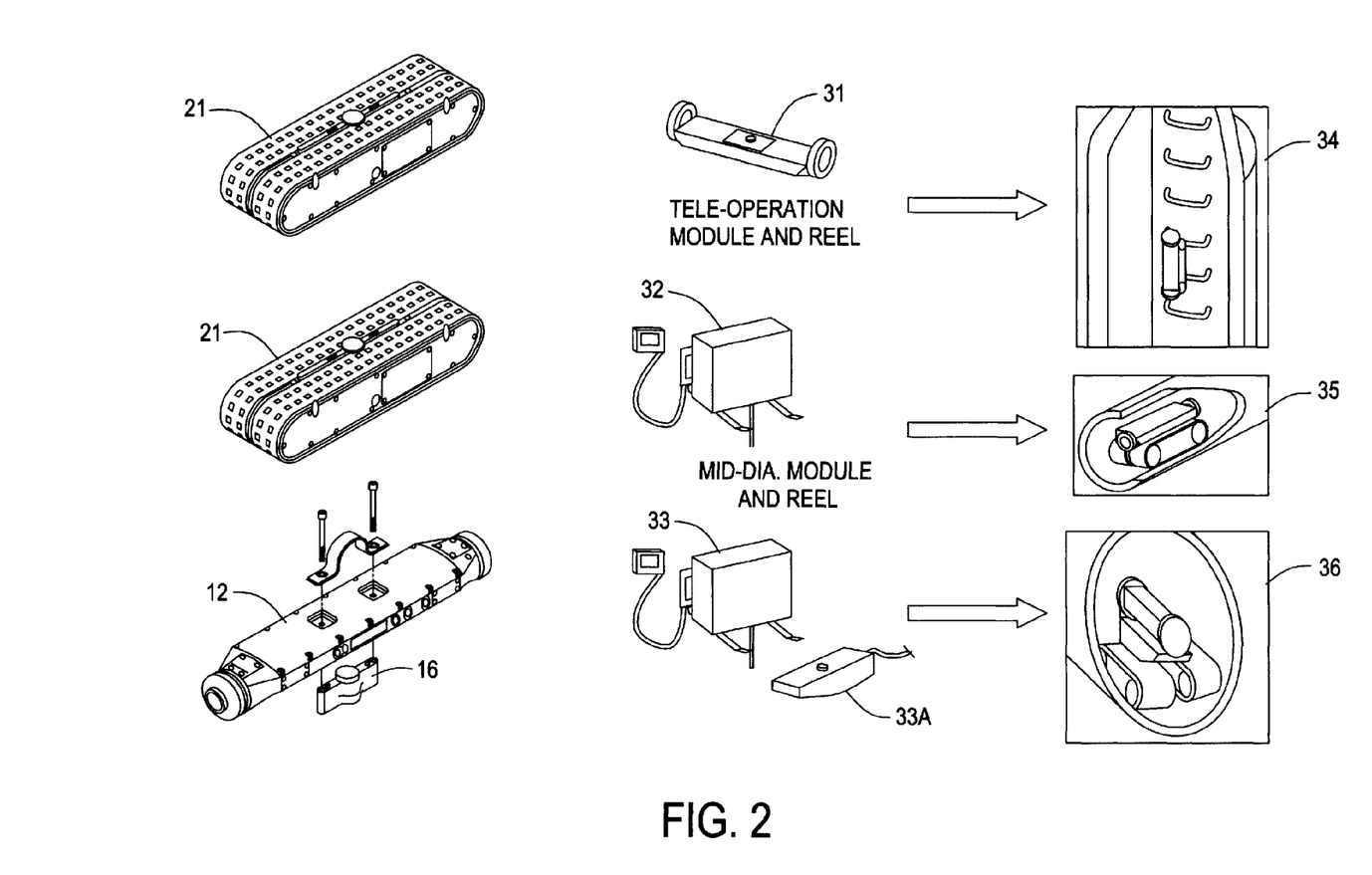
FIG. 2 illustrates example modular pipe inspection robots and modules thereof.

Referring to FIG. 2, different modules of a modular pipe inspection robot may be provided such that various inspections may be conducted. For example, sensor module 12 may be combined with one or more tractor units 21, a suitable riser 16 (and/or an adaptor 33A), a light module 31, a tele-operation module and reel 32, and/or a mid-diameter module and reel 33, to from a plurality of pipe inspection robot configurations 34, 35, 36, for example manhole inspection, tele-operation inspection, and mid-diameter pipe inspection configurations, respectively. Thus, if the sensor module 12 is combined with a single tractor unit 21 and a light module 31, a manhole inspection robot 34 may be formed. Alternatively, if sensor module 12 is combined with a single tractor unit 21, with riser 16 and tele-operation module and reel 32, a tele-operation pipe inspection robot 35 may be formed. As another example alternative, if sensor module 12 is combined with two tractor units 21 along with mid-diameter adaptor 33A and module and reel 33, a mid-diameter pipe inspection robot 36 may be formed. Additionally, as will be readily understood, other various modular components (e.g. mobility sled) may be used in addition to, in lieu of, or in some suitable combination with the example modular components illustrated in FIG. 2 to form other pipe inspection robots.

Table 1 provides a listing of components to be included in example pipe inspection robots.

TABLE 1

| | Autonomous (1) | Teleop (2) | Manhole (3) (15" Pipe Insp) | Mid-Diameter | Bolt-on Battery | Bolt-on Parasitic |
|---|---|---|---|---|---|---|
| Sensor Module | 1 | 1 | 1 | 1 | 1 | 1 |
| Tractor | 1 | 1 | 1 | 2 | | |
| Lighting Module | | | 1 | 1 | | 1 |
| Mid-Dia Module | | | | 1 | | |
| Teleop Converter | | 1 | | 1 | | |
| Parasitic Adapter | | | | | | 1 |
| Battery Module | | | | | 1 | |
| Standalone Payout Module | | 1 | | 1 | 1 | 1 |

Using the example combinations of modules in Table 1, a pipe inspection robot may be formed that can provide all the functionality that is provided by a conventional CCTV system and more. For example, the pipe inspection robots may provide 6"-24" autonomous, semi-autonomous, or tele-operation inspections, as well as manhole or vertical conduit inspections, or even bolt-on inspections where at least a sensor module 12 of the pipe inspection robot is attached to a commodity crawler or floating platform for long distance or larger platform inspections.

Each of the modules may be connected and communicate via a standardized electromechanical connection, e.g., 39, permitting a connection to be established with another of the plurality of modules. By utilizing a standardized connection, mechanical connection is assured. Moreover, the standardized electrical connection provides a common interface for module communication. As further described herein, one module may be replaced by another to achieve a different configuration of the modular robot 10, and the standardized electromechanical connection, e.g., 39, facilitates changing the modules, module discovery, etc.

Figure 3:
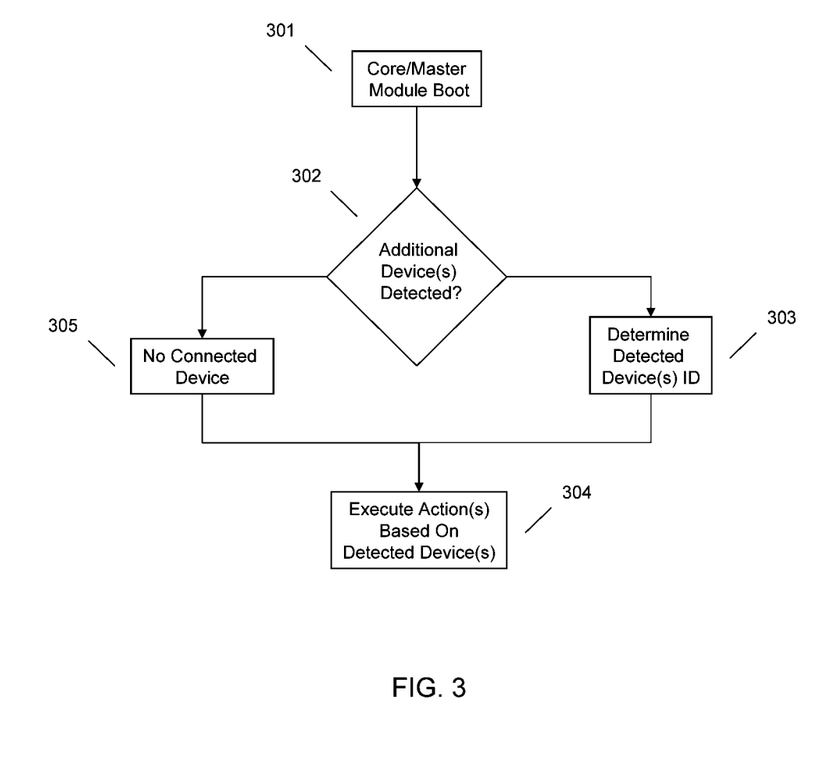
FIG. 3 illustrates an example of discovering connected modules.

Referring to FIG. 3, an embodiment provides a core or master module (also referred to herein as a parent module or node), for example within sensor module 12 (although the core or master module may be located elsewhere), such that the pipe inspection robot 10 may discover or detect the modular components that it is associated therewith and configure itself automatically. Thus, the pipe inspection robot will 10 do all the modular component or device discovery without requiring any input from a user interface.

When the core or master module boots up 301 it will go through a self-discovery phase where it identifies 302 all nodes (also referred to herein as child modules or devices) in the internal robot network (which may or may not include a remote control) and identifies a class and ID for each detected device at 303. In one embodiment, the system is independent/autonomous and does not include a remote control. Alternatively, device discovery could be initiated while the core or master module is running (i.e., after boot up) for example in response to a suitable trigger, such as connection of hardware with specified port(s) of the sensor module 12.

Based on the combination of the devices detected, or lack thereof 305, the core or master module will execute one or more actions 304. For example, based upon detected devices, the core or master module may determine the capabilities the pipe inspection robot configuration can provide and relay that to the interface for display to a user. Based on the particular configuration discovered, the modular pipe inspection robot could activate certain software, e.g. stored missions, activate certain modules differently, e.g., activate laser and sonar sensors in tandem for single pass data collection, and the like. Accordingly, in response to discovering connected devices/modules, the modular pipe inspection robot may employ various hardware and software selectively based on its current configuration.

For example, when the device is in configuration (3) of Table 1 (i.e., Manhole 15" pipe Insp.), the core or master module would recognize that the devices on the internal network are: sensor module 12, one tractor unit 21, and a lighting module 31. Accordingly, the core or master module may thus determine that it could be used as a manhole inspection robot or a 12"-18" pipe inspection robot. The list of capabilities may be relayed to a remote control device or other device and presented to the user as mission options. In response to user selection of a mission option, a graphical user interface (GUI) for that mission may be presented to the user. Optionally, the GUI may be automatically displayed, for example based on only one mission option being available for the configuration or as a default, or in response to an additional parameter, such as detected geographic location, etc. In addition to a GUI for the chosen mission option, parameters for data collection (data that is logged) may also be adjusted for the mission type. For example, in a manhole inspection mission the resolution of the camera may be set to a maximum, whereas for a pipe mission, the camera may be set for a maximum frame rate at a reasonable resolution.

Embodiments provide for modular configurations which may be selected in order to complete multiple missions in a consolidated format. For example, the pipe inspection robot 10 may inspect several infrastructure types in one insertion or deployment without reconfiguring the pipe inspection robot 10 with different hardware modules. Thus, a pipe inspection robot 10 may be configured with modules allowing it to inspect a horizontal pipe segment autonomously, and once it returns back to the start manhole, initiate a manhole inspection autonomously. Likewise, the pipe inspection robot 10 may inspect the pipe segment autonomously and then, once back at the manhole, be tele-operated for manhole inspection.

In order to transition between different mission scenarios, the pipe inspection robot is provided with a superset of the capabilities, i.e. a set that may complete each scenario. For instance, to transition from a pipe mission inspection to a manhole inspection mission, an example pipe inspection robot 10 may comprise the following modules: a tractor unit 21, a sensor module 12, a payout measurement module (which is released at a controlled rate), and a lighting module 31. The configuration for manhole inspection provided in Table 1 is for example a superset of modules that provides these capabilities and may therefore represent a configuration of the pipe inspection robot 10 suitable for the same. Through a user interface the pipe inspection robot 10 may allow for these various valid mission combinations or options to be selected in addition to individual missions.

The modular components of a pipe inspection robot 10 may include variable components providing power source(s) to the robot. For example, the pipe inspection robot 10 may have a dock module which draws energy from flow (e.g., water flow within a wastewater pipe). The dock may be physically connected to the pipe inspection robot 10 or be provided as a separate dock. In the case of a separate dock, a pipe inspection robot 10 may return to the dock intermittently or periodically to be charged (for example via inductive charging or some suitable charging arrangement) as well as for offloading or uploading (synchronizing) of data. The charging and data transmission may be completed via wire or wirelessly, depending on the modules included with the pipe inspection robot 10. As such, an embodiment including a dock may be useful for repeatedly inspecting pipe segments during a specific event of interest like a wet weather event, or during a construction event in pipes that lie near a construction site, or another high-risk zone, for example. Additionally the pipe inspection robot 10 itself may have an on-board power generation source in addition to a battery or wired power arrangement that generates power, for example from the flow in the pipe segment.

As such, modular power and data transmission arrangements allow for mitigation or elimination of restrictions on operational time in the pipe. Accordingly, a modular pipe inspection robot configuration may be chosen for example to enable continuous 24/7 operation in the pipe with continuous collection of data. The data transmission likewise may be continuous, intermittent, or periodic, relaying the pipe segment (inspection) data back to a dock or uploaded directly to a central database, wired or wirelessly.

In connection with power and data transmission configurations, a pipe inspection robot 10 may also be configured to activate or react in some way to a triggering event. For example, a problem encountered in pipe inspection is the need to understand infiltration into pipes during a rain event. However, with a conventional system (where a truck and crawler can only inspect one pipe at a time and opening the manhole lid to inspect the pipe causes a lot of water to enter the pipe through the manhole, invalidating what is being evaluated), this may not be possible.

Accordingly, an embodiment provides a pipe inspection robot 10 that addresses such circumstances by providing that the pipe inspection robot 10 that lies dormant in the pipe, for example with manhole lids closed, waiting for a trigger to initiate inspection. A pipe inspection robot 10 thus may be triggered to start autonomous inspection based on an audible trigger, wireless trigger, water flow level trigger, rain sensor trigger or similar trigger, depending on the particular hardware (e.g., sensor configuration) chosen. A plurality of such pipe inspection robots may be utilized and all or a sub set of the pipe inspection robots could be synchronized (e.g., via wireless communication there-between) to simultaneously inspect numerous pipes in parallel during the rain event in response to a trigger in one or more of the pipe inspection robots. This permits asset managers to pick out locations of infiltration within a network.

Currently when multiple sensor data are required from an inspection, they are collected in several passes of the pipe inspection robot 10 through the pipe. For example, a video inspection is completed while going out through a pipe segment with the light module 31 on, and with light module 31 turned off, a laser of sensor module 12 may be turned on for laser collection on the way back. This can result in spatial mismatch of the two data sets due to inherent location estimation error between the outgoing and incoming traversals. This prevents a tight fusion of the laser and video data.

According to an embodiment, in response to determining an appropriate module configuration of the pipe inspection robot 10, sensor data may be completed in parallel or substantially in parallel, i.e. in one pass. For example, the lighting of the lighting module 31 may be strobed or flashed and the laser data collection of the sensor module 12 may be interleaved frame by frame with video collection by the sensor module 12, coordinated in time with the lighting module 31. For example, alternating frames have an image of the pipe with lighting, and an image of just the laser projection on the pipe. Since this switching may be executed at a very high frequency, there is high spatial and temporal coherence between the image and laser data resulting in a much higher quality of sensor fusion. This temporal multiplexing allows the system to conserve energy and weight by reducing the duty cycle of when the lights are on, while still providing highly synchronized data.

As another example, a single modular pipe inspection robot 10 may be configured to inspect different infrastructure types in a single pass. As a specific, non-limiting example, an example pipe inspection robot 10 may include modules sufficient for it to take on both a horizontal pipe inspection configuration (e.g. 35) and a manhole pipe inspection configuration (e.g. 34). In such an embodiment, the pipe inspection robot 10 comprises modules to collect data in the horizontal pipe inspection configuration (35) and, when a return to a manhole is made, continue to collect data in a manhole configuration (34), for example as it is reeled (or reels itself) back up to a manhole cross bar hanger. The pipe inspection robot 10 in the manhole inspection configuration (34) may also collect data on its way down into a manhole, prior to inspecting a horizontal pipe. Thus, pipe inspection robot 10 comprises modules (34, 35) to complete inspections of different infrastructure types in a single pass. Other single pass configurations are of course possible, depending on the modules included in the particular pipe inspection robot 10 configuration.

Figure 4:
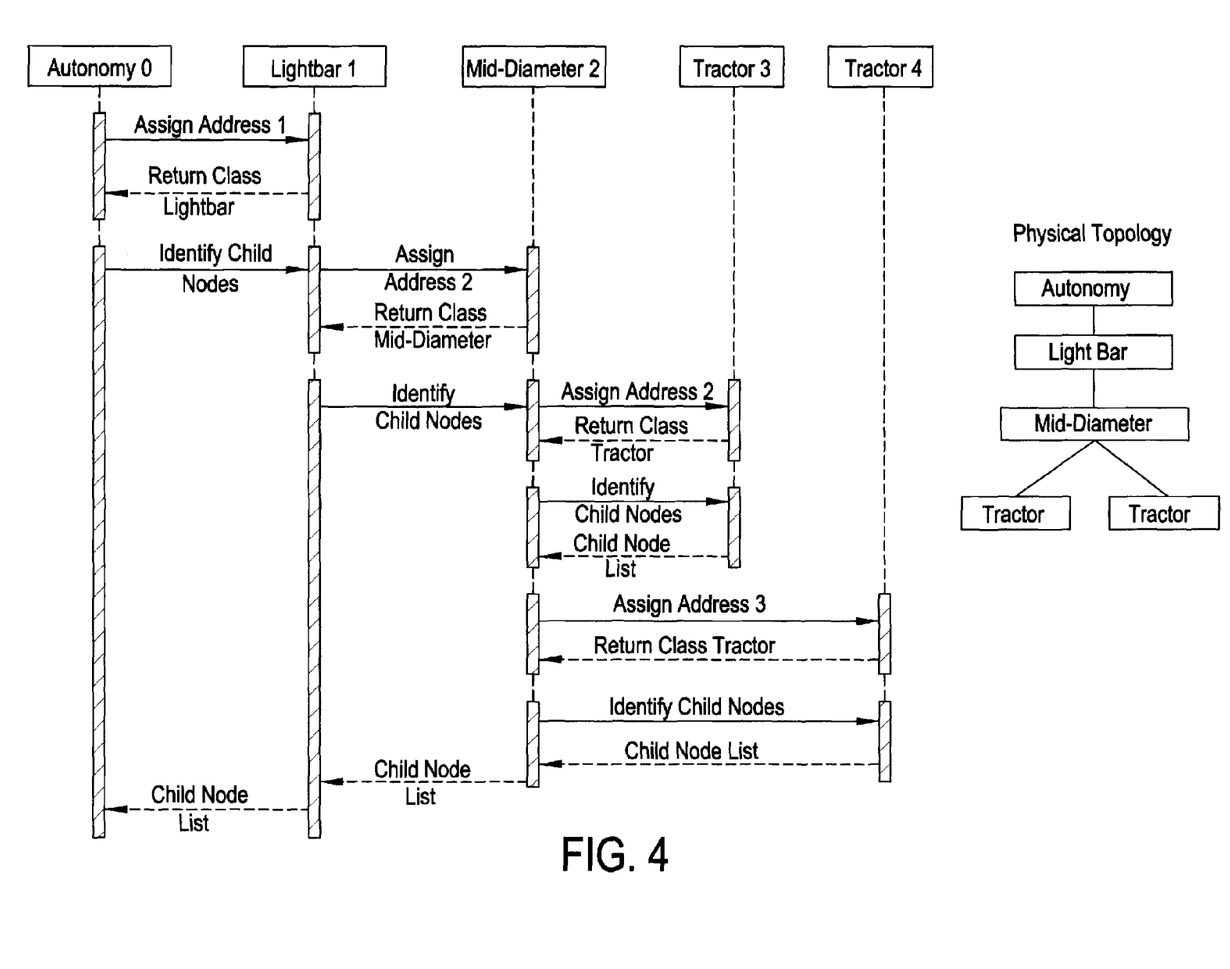
FIG. 4 illustrates an example sequence of events that creates the address table of an example modular pipe inspection robot.

Referring to FIG. 4, an example addressing sequence for module discovery by a master/parent module is illustrated. In FIG. 4, the addressing and identify process is described in an example wherein each module (node) is connected to its neighbor modules (nodes), using for example direct point-to-point links (e.g., as RS232, RS485, or SPI). Each node may have the following knowledge: what type of node it is (e.g. light module 31, tractor unit 21, sensor 12, etc.); and how many child nodes it has in the internal network.

Each node must first receive an address from its parent node (i.e., the node closer to the network master (parent module)), and return its type. Then, upon request from its parent, the node assigns addresses to all of its child nodes, and returns a list of children. The nodes therefore recursively generate a flat list of addressed nodes, which is presented to the network master. Accordingly, the parent module is apprised of all nodes in the internal network for a given pipe inspection robot 10 configuration, along with addressing for these nodes (e.g., for use in sending messages including commands, requests for information, etc.). A diagram of the pipe inspection robot configuration for the example addressing sequence of FIG. 4 is provided in the right panel of FIG. 4.

Figure 5:
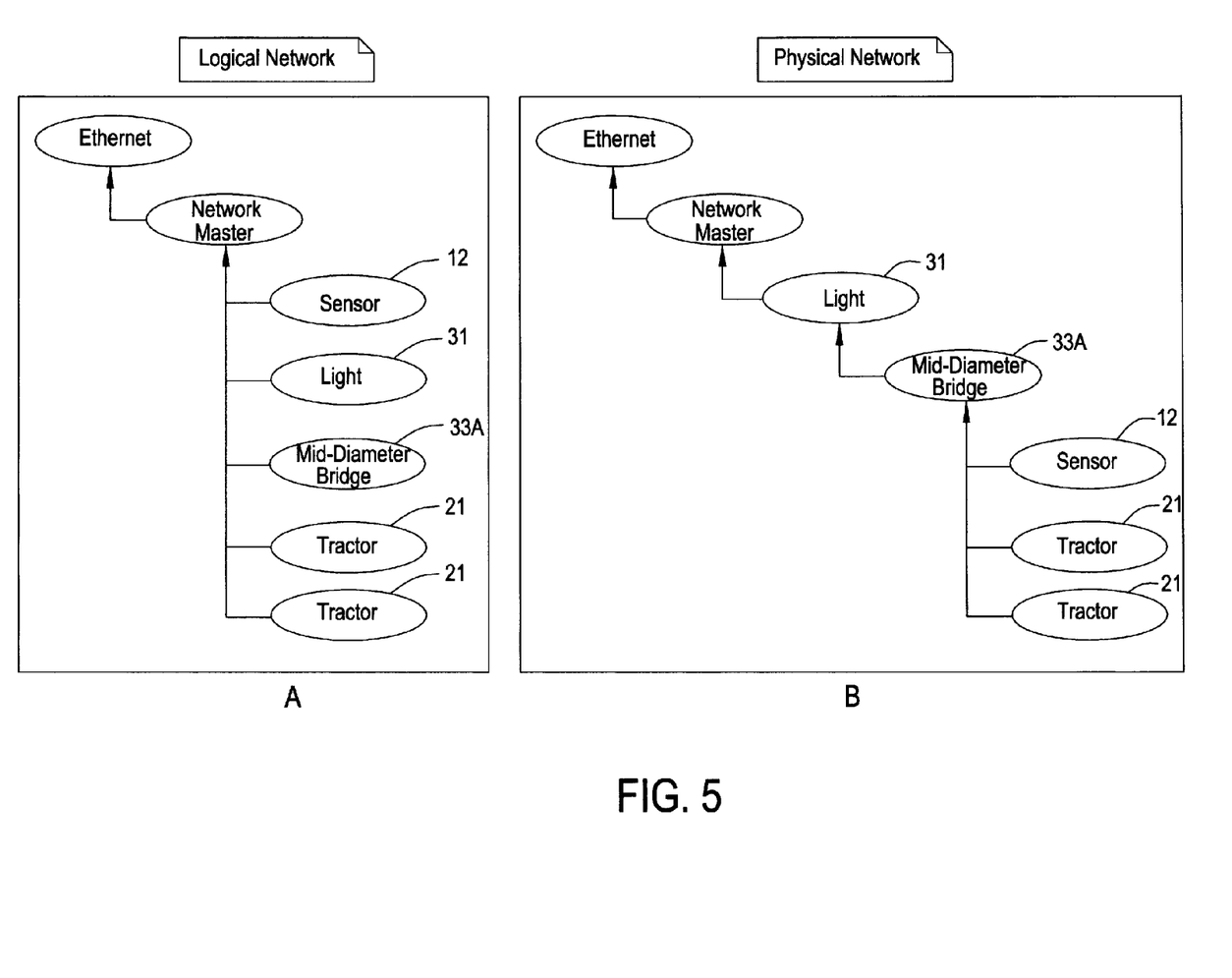

FIG. 5(A-B) illustrates a flat addressing scheme for reducing complexity of a software build for a pipe inspection robot 10. The flat list (FIG. 5A) for a logical network maps to the actual connections of a physical network of nodes (FIG. 5B). Thus, FIG. 5B illustrates how the modules of an example pipe inspection robot are physically connected to one another. FIG. 5A illustrates how these modules are logically connected, in this example two tractor units 21, a mid diameter bridge or adaptor 33A, a light module 31, and a sensor module 12 are all logically connected to the master or core module (network master). The flat address list of FIG. 5A mapped to the physical layout of the network of FIG. 5B, as illustratively diagrammed, allows for logical complexity reduction. Such logical complexity reduction in turn allows for maintainability of the software that runs the various modules within the pipe inspection robot 10 (modular network). For example, as different subsets of modules are built or added to/taken away from the pipe inspection robot 10, the network master need only know its capabilities and the details of the modules' actual physical connections are essentially irrelevant or transparent.

Figure 6:
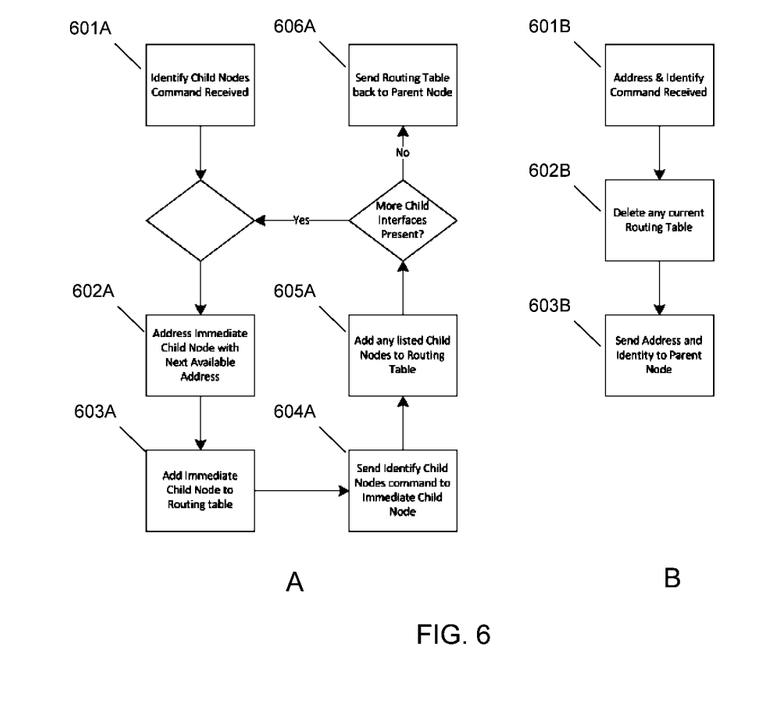

FIG. 6(A-B) illustrate examples of processes that each module (node) must undergo as it receives network administration messages (FIG. 4). In FIG. 6A, an example of node/module identification of child/subordinates is illustrated. On receipt of an "identify subordinates" command 601A, for example from a superior (e.g., parent module), a child node may address its immediate child node at 602A and add this address to the routing table of the node at 603A. The node that received the command may then pass a command to identify subordinates to its immediate child node/subordinate at 604A, which will in turn add any subordinates to the routing table at that node at 605A. If there are remaining connections (other child nodes) of the initial node that received the identify subordinates command, the process may iterate. Otherwise, once the child nodes' addresses have been collected, the routing table may be returned to the requesting node/module (e.g., parent module).

In FIG. 6B, an example process for re-addressing (and identifying) is illustrated. For example, if a node (e.g., parent module) ascertains a new configuration, a re-addressing of the network elements (i.e., connected modules/nodes) may be appropriate to account for new connection(s). As such, a node may receive an address and identify command at 601B, at which point the node will delete and current routing table and re-address itself at 602B. The node may then send its address (updated) to the requesting node along with an identification at 603B. If a node's address is re-assigned, its entire routing table must be re-built and all of its child nodes re-assigned to ensure proper network addressing and identifications (e.g., Address: 1; ID: light module 21) are returned to the core module on a reconfiguration of the pipe inspection robot 10.

Figure 7:
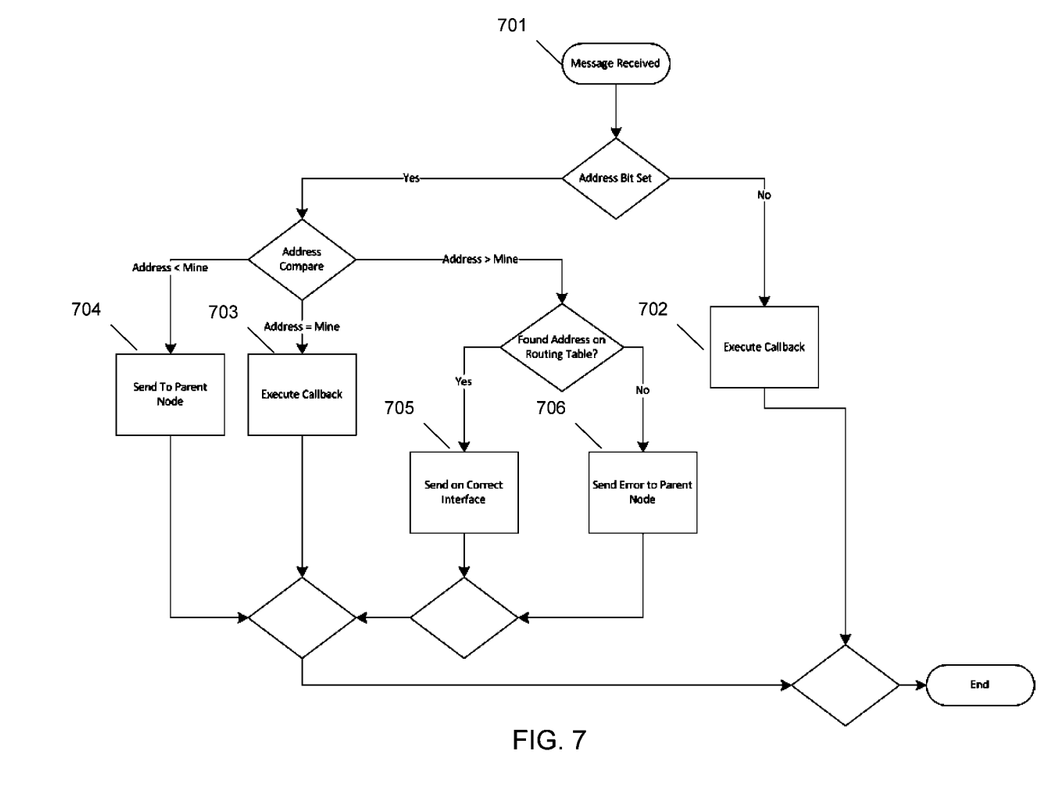
FIG. 7 illustrates an example process of address resolution within a given module of a modular pipe inspection robot.

FIG. 7 illustrates an example routing state machine or address resolution process that may be utilized by a modular pipe inspection robot 10. After the addressing sequence has taken place, each module may undergo a process in response to reception of a message, after the node's routing table has been built. FIG. 7 illustrates an example decision tree that is adaptable to messages received on any interface.

For example, on issuing a message or a command, the message is received at 701. The address may be inspected by the node, and if unusable, a call back may be executed at 702. However, if an address exists, it is determined where to send the message. An addressing scheme such as that described herein may have a rule wherein numerical addresses are utilized, with parent/superior nodes (in the network tree) have lesser addresses, inferior/child nodes having greater address numbers. By having addresses grow as child nodes are added, this avoids limiting the amount of nodes that can be connected to the system.

As such, if the address is that of the recipient node, a call back may be executed at 703. However, if the address is greater than that of the node, the node may pass the message to the parent/superior at 704. Likewise, if the address is lesser than the recipient node's address, it may be transmitted to a child node at 705. If the recipient node does not have the lesser address in the node routing table, a not found indication may be issued (e.g., on the parent/superior interface for communication back to the parent module or network master).

As will be readily apparent, other addressing schemes may be utilized in addition to or in combination with the example addressing schemes described herein. Thus, the pipe inspection robot's 10 core or master module may effectively communicate with child nodes in the internal network, and readdressing/identification procedures may be carried out as necessary to ensure proper communication between the various modules of a given configuration, as the configuration of the pipe inspection robot may change.

Figure 8:
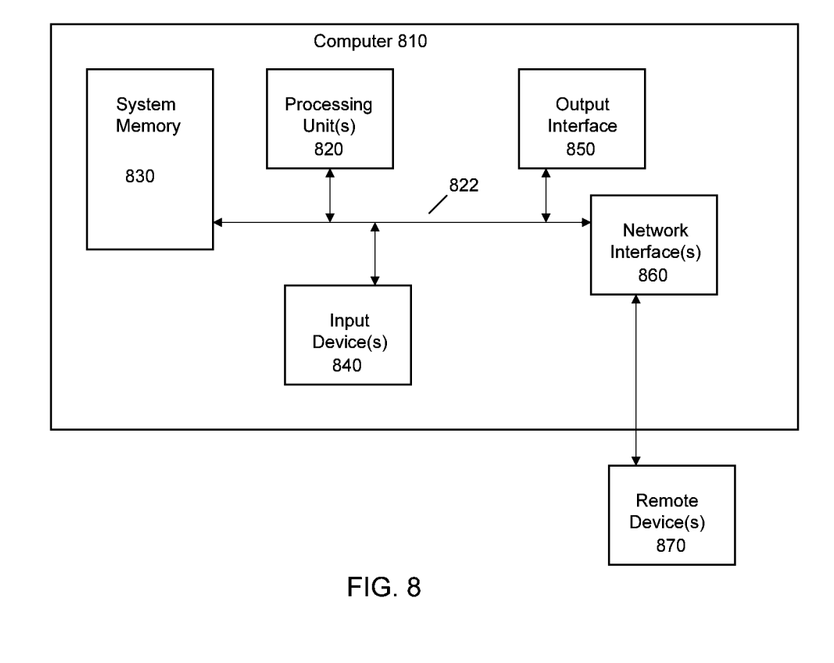
FIG. 8 illustrates an example computing device.

It will be readily understood that certain embodiments can be implemented using any of a wide variety of devices or combinations of devices. Referring to FIG. 8, an example device that may be used in implementing one or more embodiments includes a computing device (computer) 810, for example providing functionality of pipe inspection robot 10 modules or components, such as the core or master module. In this regard, the core or master module may be provided as a central coordinator for the various modules of the pipe inspection robot. The core or master module may be incorporated into any of the modules of pipe inspection robot or may be provided as an external device wirelessly connected to the pipe inspection robot 10. Thus, the core or master module may coordinate communications between the various modules, report on various connected modules/devices, e.g., to a central facility, assist in executing actions such as mission selection, and perform other functionality of the pipe inspection robot 10 described herein.

The computer 810 may execute program instructions configured to store an analyze segment data, and perform other functionality of the embodiments, as described herein. Components of computer may include, but are not limited to, a processing unit 820, a system memory 830, and a system bus 822 that couples various system components including the system memory 830 to the processing unit 820. The computer 810 may include or have access to a variety of computer readable media, for example for storing infrastructure data indices. The system memory 830 may include computer readable storage media in the form of volatile and/or nonvolatile memory such as read only memory (ROM) and/or random access memory (RAM). By way of example, and not limitation, system memory 830 may also include an operating system, application programs, other program modules, and program data.

A user can interface with (for example, enter commands and information) the computer 810 through input devices. A monitor or other type of device can also be connected to the system bus 822 via an interface, such as an output interface 850. In addition to a monitor, computers may also include other peripheral output devices. The computer 810 may operate in a networked or distributed environment using logical connections to one or more other remote computers, databases or modules. The logical connections may include a network, such local area network (LAN) or a wide area network (WAN), but may also include other networks/buses.

It should be noted as well that certain embodiments may be implemented as a system, method or computer program product. Accordingly, aspects may take the form of an entirely hardware embodiment, an entirely software embodiment (including firmware, resident software, micro-code, et cetera) or an embodiment combining software and hardware aspects that may all generally be referred to herein as a "circuit," "module" or "system." Furthermore, aspects may take the form of a computer program product embodied in one or more computer readable medium(s) having computer readable program code embodied therewith.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples of the computer readable storage medium would include the following: a portable computer diskette or memory stick, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible, non-signal storage medium that can contain or store a program for use by or in connection with an instruction execution system, apparatus, or device.

Computer program code may be propagated by data signal for transmission between devices. Such a propagated signal may take any of a variety of forms, including, but not limited to, electro-magnetic, optical, or any suitable combination thereof. Program code embodied on a computer readable storage medium thus may be transmitted using any appropriate medium, including but not limited to wireless, wired, optical fiber cable, RF, et cetera, or any suitable combination of the foregoing.

Computer program code for carrying out operations for various aspects may be written in any combination of one or more programming languages. The program code may execute entirely on a single computer (device), partly on a single computer, as a stand-alone software package, partly on single computer and partly on a remote computer or entirely on a remote computer or server. In the latter scenario, the remote computer may be connected to another computer through any type of network, including a local area network (LAN) or a wide area network (WAN), or the connection may be made for example through the Internet using an Internet Service Provider.

It will be understood that various functionality described herein may be implemented by computer program instructions. These computer program instructions may be provided to a processor of a device to produce a machine, such that the instructions, which execute via the processor create means for implementing the functions/acts specified.

These computer program instructions may also be stored in a computer readable storage medium that can direct a device to function in a particular manner, such that the instructions stored in the computer readable storage medium produce an article of manufacture including instructions which implement the function/act specified.

The computer program instructions may also be loaded onto a device to cause a series of operational steps to be performed on the device to produce a device implemented process such that the instructions which execute on the device provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A modular infrastructure asset inspection robot, comprising:
   a sensor module for use in inspecting interiors of fluid conveyance infrastructure assets;
   said sensor module including at least one standardized electromechanical connection permitting a connection to be established with another module;
   a tractor unit comprising:
      adjacent tracks that cover a substantial portion of the width of a chassis portion of the tractor unit; and
      a standardized electromechanical connection permitting connection to be established with the sensor module, wherein said standardized electromechanical connection of the tractor unit is located between the adjacent tracks;
   said tractor unit being interchangeable with another module, riser or adaptor that attaches to the sensor module using the at least one standardized electromechanical connection of the sensor module, allowing reconfiguration of said modular infrastructure asset inspection robot;
   said modular infrastructure asset inspection robot acting to:
   automatically discover, using a processor of said sensor module, each module attached to the sensor module; and
   determine, using the processor, one or more inspection mission options for different infrastructure asset types based on discovery of one or more modules connected to the sensor module.

2. The modular infrastructure asset inspection robot of claim 1, wherein the fluid conveyance infrastructure assets comprise a horizontal pipe segment and a manhole.

3. The modular infrastructure asset inspection robot of claim 1, wherein the mobile infrastructure inspection robot to performs two or more deployment methods including autonomous deployment and tele-operation deployment.

4. The modular infrastructure asset inspection robot of claim 3, wherein the two or more deployment methods include a self-propelled tracked deployment method.

5. The modular infrastructure asset inspection robot of claim 3, wherein the two or more deployment methods include a self-propelled tracked platform deployment method.

6. The modular infrastructure asset inspection robot of claim 1, further comprising software modules adapted to communicate utilizing the at least one standardized electromechanical connection.

7. The modular infrastructure asset inspection robot of claim 1, wherein the modular infrastructure asset inspection robot determines message addressing to each module attached to the sensor module by obtaining addressing information from a network master provided in one of the modules of the modular infrastructure asset inspection robot.

8. The modular infrastructure asset inspection robot of claim 7, wherein the network master is provided in the sensor module.

9. The modular infrastructure asset inspection robot of claim 8, wherein the network master acts as a parent node to one or more child nodes in a network topology comprising one or more child nodes in other modules of the modular infrastructure asset inspection robot.

10. The modular infrastructure asset inspection robot of claim 9, wherein the parent node provides an address to each child node directly connected to the parent node.

11. The modular infrastructure asset inspection robot of claim 10, wherein a child node assigns addresses to all of its child nodes.

12. The modular infrastructure asset inspection robot of claim 11, wherein the patent node is thereafter apprised of all nodes of the network topology for a configuration of the modular infrastructure asset inspection robot.

13. A modular infrastructure asset inspection robot, comprising:
   a plurality of modules connectable via a standardized electromechanical connection;
   a sensor module comprising a discovery module with at least one processor configured to detect that the sensor module has been connected to at least a second module;
   wherein the sensor module and the at least a second module are connectable for use in fluid conveyance infrastructure assets and provide inspection capability for more than one fluid conveyance infrastructure asset type in a single deployment;
   said at least a second module comprising:
      a tractor unit comprising: adjacent tracks that cover a substantial portion of the width of a chassis portion of the tractor unit, and a standardized electromechanical connection for connecting to another standardized electromechanical connection of the sensor module, wherein said standardized electromechanical connection of the tractor unit is located between the adjacent tracks;
   said modular infrastructure asset inspection robot using the discovery module to discover a configuration of one or more modules connected to the sensor module to select one or more mission options for inspection of a fluid conveyance infrastructure asset type.

14. The modular infrastructure asset inspection robot of claim 13, wherein the more than one fluid conveyance infrastructure asset type includes pipes and manholes.

15. The modular infrastructure asset inspection robot of claim 13, wherein said modular infrastructure asset inspection robot, in response to determining a module configuration, operates the sensor module to collect sensor data of more than one type in parallel.

16. The modular infrastructure asset inspection robot of claim 15, further comprising a lighting module connected to the sensor module.

17. The modular infrastructure asset inspection robot of claim 16, wherein the lighting module and the sensor module are connected via a standardized electromechanical connection disposed on the lighting module.

18. The modular infrastructure asset inspection robot of claim 15, wherein said modular infrastructure asset inspection robot operates the sensor module to collect sensor data of more than one type in parallel by interleaving light image and laser data collection.

19. The modular infrastructure asset inspection robot of claim 18, wherein the interleaving comprises temporal multiplexing of a laser and the lighting module as the modular infrastructure asset inspection robot traverses the interior of a fluid conveyance infrastructure asset.

\* \* \* \* \*